(12) United States Patent
Fang et al.

(10) Patent No.: US 9,247,494 B2
(45) Date of Patent: Jan. 26, 2016

(54) NETWORK NODE SELECTION IN WIRELESS NETWORKS

(71) Applicant: FUJITSU LIMITED, Kawasaki-shi, Kanagawa (JP)

(72) Inventors: Yiwei Fang, High Wycombe (GB); Rajne Agarwal, Northwood (GB)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/265,996

(22) Filed: Apr. 30, 2014

(65) Prior Publication Data

US 2015/0038159 A1    Feb. 5, 2015

(30) Foreign Application Priority Data

Jul. 31, 2013    (EP) ..................................... 13178726

(51) Int. Cl.
*H04W 48/20* (2009.01)
*H04W 48/16* (2009.01)

(52) U.S. Cl.
CPC .............. *H04W 48/20* (2013.01); *H04W 48/16* (2013.01)

(58) Field of Classification Search
None
See application file for complete search history.

(56) References Cited

U.S. PATENT DOCUMENTS

| | | | |
|---|---|---|---|
| 5,749,044 A * | 5/1998 | Natarajan et al. ............ | 455/13.1 |
| 2005/0070279 A1 | 3/2005 | Ginzburg et al. | |
| 2006/0142004 A1 | 6/2006 | He et al. | |
| 2007/0004415 A1 * | 1/2007 | Abedi ........................... | 455/442 |
| 2009/0047968 A1 * | 2/2009 | Gunnarsson et al. ......... | 455/446 |
| 2009/0181676 A1 * | 7/2009 | Lee et al. ...................... | 455/436 |
| 2009/0239535 A1 * | 9/2009 | Chun et al. ................. | 455/435.2 |
| 2009/0303891 A1 * | 12/2009 | Lucas et al. ................... | 370/252 |
| 2011/0039564 A1 * | 2/2011 | Johnstone et al. ........... | 455/436 |
| 2011/0286437 A1 * | 11/2011 | Austin et al. .................. | 370/338 |
| 2012/0196644 A1 | 8/2012 | Scherzer et al. | |
| 2012/0250548 A1 * | 10/2012 | Swaminathan et al. ...... | 370/252 |
| 2015/0085746 A1 * | 3/2015 | Somayazulu et al. ........ | 370/328 |

FOREIGN PATENT DOCUMENTS

| | | |
|---|---|---|
| EP | 1 370 050 | 12/2003 |
| EP | 1 708 526 | 10/2006 |
| EP | 1 937 007 | 6/2008 |
| WO | WO 2007/044255 | 4/2007 |

OTHER PUBLICATIONS

European Search Report mailed Feb. 17, 2014 in corresponding European Application No. 13178726.9-1854.

* cited by examiner

*Primary Examiner* — Kimberly A Williams
(74) *Attorney, Agent, or Firm* — Staas & Halsey LLP

(57) ABSTRACT

A method of selecting a network node with which a mobile terminal is to establish a connection for wireless communication. The method comprises generating a ranked list of network nodes that are available to the mobile terminal for establishing the connection, each of the available network nodes being ranked based on historical data relating to a plurality of different radio characteristics of the network node and on weighting factors associated with the plurality of different radio characteristics, each of the weighting factors having a value that is determined based on historical data relating to one or more mobile terminal usage characteristics; and selecting the network node for establishing the connection with the mobile terminal based on the ranked list of network nodes.

9 Claims, 7 Drawing Sheets

NETWORK NODE SELECTION IN WIRELESS NETWORKS

CROSS-REFERENCE TO RELATED APPLICATIONS

This application claims the benefit of European Application No. 13178726.9, filed Jul. 31, 2013, the disclosure of which is incorporated herein by reference.

BACKGROUND

1. Field

Embodiments described herein generally relate to network node selection in wireless networks, and in particular but not exclusively to network node selection in multi-RAT networks.

2. Description of the Related Art

Wireless communication systems are known in which a terminal, mobile station or user equipment (henceforth referred to as a terminal or mobile terminal for convenience) communicates wirelessly with a base station or access point (henceforth referred to as a network node for convenience) within its coverage area by use of a certain radio access technology (RAT). Examples of different radio access technologies include the 3GPP family of standards including GSM, GPRS, UMTS and LTE, as well as WiMax (IEEE802.16), CDMA and WiFi (IEEE802.11).

Often, multiple network nodes may be available in the same location. A mobile terminal may therefore be able to connect to one of several network nodes. However, the mobile terminal will typically perform a default scanning and selection process to determine an appropriate network node. In many cases, such a process can lead to quick drain of battery power as well as potentially long connection times. Furthermore, the radio access technologies and radio characteristics of the available network nodes may vary. For example, although WiFi latency may be lower than cellular latency, the consistency in latency may be better with cellular access. This may impact the performance of a requested service.

It is therefore desirable to provide improved methods, systems and apparatuses for network node selection.

SUMMARY

Additional aspects and/or advantages will be set forth in part in the description which follows and, in part, will be apparent from the description, or may be learned by practice of the invention.

According to one embodiment, there is provided a method of selecting a network node with which a mobile terminal is to establish a connection for wireless communication, the method comprising: generating a ranked list of network nodes that are available to the mobile terminal for establishing the connection, each of the available network nodes being ranked based on historical data relating to a plurality of different radio characteristics of the network node and on weighting factors associated with the plurality of different radio characteristics, each of the weighting factors having a value that is determined based on historical data relating to one or more mobile terminal usage characteristics; and selecting the network node for establishing the connection with the mobile terminal based on the ranked list of network nodes.

The use of historical data permits a suitable network node to be selected without the need for the mobile terminal to perform a network scan (i.e., discovery). This can save not only connection time, but also battery life of the mobile terminal. Furthermore, this can address the situation where a mobile terminal, with an existing connection to a network node providing poor wireless communication, does not attempt to connect to a different network node potentially providing better wireless communication because a connection is already established. The use of weighting factors allows particular radio characteristics to be prioritized over others, so that a network node most suitable for the connection can be identified.

As used herein, the term "historical data" generally refers to data obtained at an earlier point or period in time, for example a previous day. At least the historical data relating to mobile terminal use may be specific to the mobile terminal (i.e., the user of the mobile terminal). In this way, the network node ranking may take into account past user behaviour. The term "ranked list" generally refers to an order of preference among the network nodes. A ranked list may be generated in advance and stored in any suitable format, or could be generated when the connection is to be established.

The radio characteristics may be transmission and/or reception characteristics. The usage characteristic may comprise one or a combination of: time of use, type of communication service used, mobile terminal mobility during use, and location of use.

Herein, "type of communication service" is intended to encompass any type of communication functionality that can be provided for mobile terminals. For example, the type of communication may be one or a combination of the following: a type of traffic (e.g. voice, data, video, VoIP, etc), a type of subscription, a type of communication protocol (e.g., unreliable or best-effort protocol, reliable protocol), and a type of radio access technology. As used herein, a data service can refer to any one of a plurality of different services such as web services, email services, gaming services, streaming services, information services, and so on. However, it will be understood that communication service types are often categorized in different ways by different service providers, standards bodies, network operators, and so on.

Some or all of the historical data may be used. For example, the historical data may correspond to a particular time of the day, week, month and/or year. In one particular example, the historical data corresponds to the time of the day at which the connection is to be established. Thus, where mobile terminal users typically follow a set routine most of the days and at most times, there is a likelihood that at any particular time and location the same network node is available for access. In another particular example, the historical data corresponds to one of a plurality of times of the day that have varied time intervals therebetween. For example, data may be available for shorter intervals (e.g., 5-minute time slots) during the day, and for longer intervals (e.g., 15-minute time slots) during the night. It will be understood that these times are exemplary only.

In one embodiment, generating the ranked list comprises, for each of the plurality of different radio characteristics: determining a rank rating for each of the available network nodes, and weighting each rank rating with the weighting factor associated with the radio characteristic. The ranking can therefore be controlled at a fine level of granularity. The final ranking of a network nodes may be the sum of the weighted rank ratings.

The historical data may be based on measurements performed by different entities. For example, at least some of the historical data may be based on measurements performed by the network nodes. Alternatively, or additionally, at least some of the data may be based on measurements performed by one or more mobile terminals including the mobile terminal. Thus, the historical data may data obtained by measurements performed by the network nodes, the mobile terminals, or a combination of both. Such data may be transmitted to and received by a central entity for storing. The central entity may therefore accumulate data from mobile terminals and/or network nodes in order to increase knowledge of the overall network environment. As such, the central entity may be well suited to generate the ranked list of available network nodes and/or distribute stored historical data as required. In some embodiments, the mobile terminal generates the ranked list based on historical data stored locally at the mobile terminal. This may be supplemented by historical data stored at the central server. The term "central entity" is intended to represent any computing device, such as a server, that is remote from, but accessible to, mobile terminals and having data storage and processing capabilities for supporting the selection of network nodes.

In one embodiment, new data relating to one or more of the plurality of different radio characteristics of the selected network node and/or new data relating to mobile terminal use with respect to the connection is sent to the central entity. As the amount of data increases, a convergence towards an 'ideal' ranked list of available network nodes may be expected.

In one embodiment, the historical data corresponds to a historical window of time.

The term "network node" generally refers to a communications point in a network and that supports communications using a particular radio access technology. Network nodes employing different radio access technologies may be provided in physically distinct entities or may be provided in the same physical entity. Furthermore, a network node may be reconfigurable in order to be used with different radio access technologies. The available network nodes may be configured to use at least one of a plurality of different radio access technologies. Thus, the selection may be made between network nodes employing the same radio access technology or network nodes employing different radio access technologies.

According to one embodiment, there is provided an apparatus, comprising: a selector configured to select a network node with which a mobile terminal is to establish a connection for wireless communication, based on a ranked list of network nodes that are available to the mobile terminal to the mobile terminal for establishing the connection, wherein each of the available network nodes is ranked based on historical data relating to a plurality of different radio characteristics of the network node and on weighting factors associated with the plurality of different radio characteristics, each of the weighting factors having a value that is determined based on historical data relating to one or more mobile terminal usage characteristics.

In one embodiment, the apparatus further comprises a storage medium configured to store the historical data.

In one embodiment, the apparatus is a mobile terminal or a central server.

In any of the above aspects, the various features may be implemented in hardware, or as software modules running on one or more processors. Features of one embodiment may be applied to any of the other embodiments.

Embodiments also provide a computer program or a computer program product for carrying out any of the methods described herein, and a computer readable medium having stored thereon a program for carrying out any of the methods described herein. A computer program embodying the invention may be stored on a computer-readable medium, or it could, for example, be in the form of a signal such as a downloadable data signal provided from an Internet website, or it could be in any other form.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Figure 1:
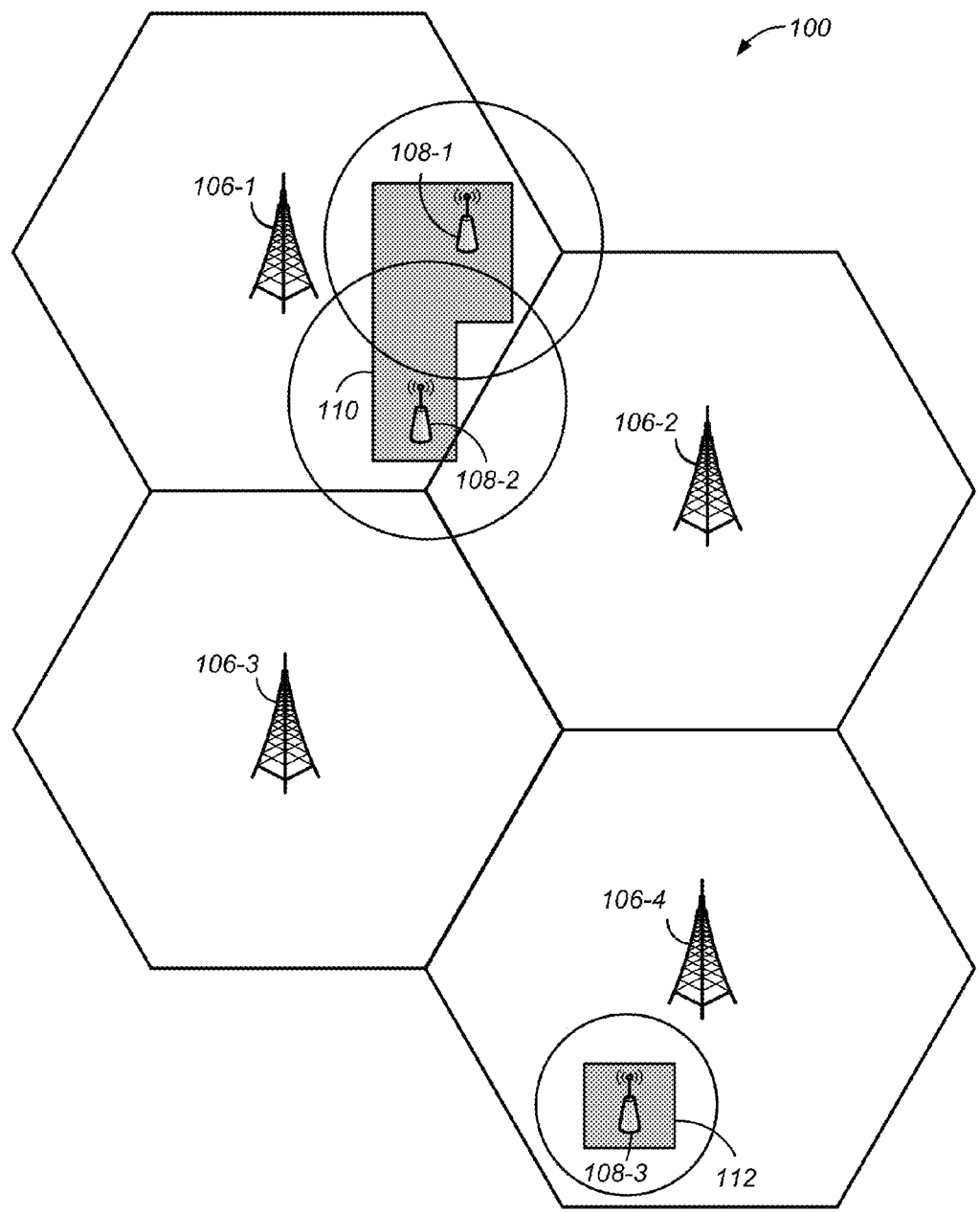
FIG. 1 schematically illustrates a multi-RAT (multi-Radio Access Technology) wireless communication network in which embodiments maybe be implemented.

Reference will now be made in detail to the embodiments, examples of which are illustrated in the accompanying drawings, wherein like reference numerals refer to the like elements throughout. The embodiments are described below to explain the present invention by referring to the figures.

In the following description, embodiments will be described in the context of a multi-RAT network, comprising an LTE network (macrocell or small cell such as microcell, picocell and femtocell) and a WiFi (IEEE802.11) network, in which a device can communicate with network nodes of both networks. The term "multi-RAT wireless communication network" is generally used to denote the combined wireless communication networks available to the mobile terminal within a given geographical area, except as otherwise demanded by the context. In LTE, mobile terminals are called user equipments (UEs) and network nodes are called base stations or eNodeBs (eNBs), whereas in WiFi the network nodes are called access points (APs). For convenience, the terms mobile terminal and network node will be used in the following description. However, it will be understood that the described embodiments are applicable to networks employing a single radio access technology as well as to other radio access technologies including, but not limited, other parts of the 3GPP family of standards including GSM, GPRS, and UMTS, as well as WiMAX (IEEE802.16), CDMA and Bluetooth. Accordingly the terminology used in the following description is not intended to be limiting.

FIG. 1 is a schematic illustration of a multi-RAT wireless communication network 100 comprising an LTE network and WiFi networks (hotspots). The LTE network comprises base stations 106-1, 106-2, 106-3 and 106-4 provided in appropriate locations so as to form a network covering a wide geographical area more or less seamlessly with adjacent and/or overlapping cells. The WiFi networks comprise access points 108-1, 108-2 and 108-3. In this example, access points 108-1 and 108-2 are located in an office 110 and access point 108-3 is located in a home 112. For convenience, the coverage areas of the base stations 106-1, 106-2, 106-3 and 106-4 are shown as hexagons and the coverage areas of the access points 108-1, 108-2 and 108-3 are shown as circles. However, it will be understood that in practice coverage areas may have different shapes which can depend on location, density of users, topography, and so on.

As will be apparent from FIG. 1, at some locations several network nodes may be available to a mobile terminal for connection. Examples of the conventional means of scanning and connection will now be described. The following assumptions are made. It is assumed that a mobile terminal supports both WiFi and LTE technologies. It is also assumed that the settings of the mobile terminal are such that both the WiFi and cellular data services are in "active" mode. Furthermore, it is assumed that the user of the mobile terminal is an employee with regular daytime working hours during the week. During the evenings and on weekends the user spends time at home and elsewhere. The user regularly uses both data and voice services.

At home 112, when connection is required for a data service, a mobile terminal scans and discovers WiFi access point 108-3 and LTE base station 106-4, and may choose to use the WiFi network (i.e., connect to Wi-Fi access point 108-3) for example based on the required service. However, there may be other cases where the LTE network is a better choice compared to the WiFi network, for example if the data traffic density and therefore the loading factor is high on WiFi access point 108-3. Therefore, RAT selection based on service type alone may lead to connection to a sub-optimal network node. When connection is required for a voice service, the mobile terminal scans and discovers WiFi access point 108-3 and LTE base station 106-5, and chooses to use the LTE network (i.e., connect to base station 106-5) for example based on service and signal strength.

At the office 110, when connection is required for a data service, the mobile terminal scans and discovers one or both WiFi access points 108-1, 108-2 and LTE base station 106-1, and may attempt to connect to WiFi access point 108-1 based on service and signal strength for example. However, assuming that the WiFi network in the office 100 is restricted for official use only, the mobile device may not be authorized on that WiFi network. Therefore, the initial attempt at connection fails at the authorization stage. The mobile device may then attempt connection to the next available network node, which may be the other WiFi access point 108-2 or LTE base station 106-1. A connection to base station 106-1 may finally succeed. However, the mobile terminal may continue to scan and attempt connection to one of the WiFi access points 108-1, 108-2 for all subsequent data connections. When connection is required for a voice service, the mobile terminal again scans and discovers one or both WiFi access points 108-1, 108-2 and LTE base station 106-1, and chooses to use the base station 106-1 based on service and signal strength for example.

It will be apparent that such conventional methods may lead to delay in connection time and can result in draining of the battery power of the mobile device. As the capabilities of mobile terminals continue to evolve and increase, it is desirable to restrict power consumption of the device and increase time required between subsequent charges.

In embodiments, information about the availability of network nodes at particular times and locations is provided to a mobile terminal, so that the scanning process typically performed by the mobile terminal may in many cases not be required for discovery of network nodes. Furthermore, information about radio characteristics with respect to each of the available network nodes is provided to the mobile terminal, so that the mobile terminal can potentially attempt connection directly to a network node that ranks highest based on service type without performing the scanning process.

In one particular embodiment, which will now be described in more detail, selection of a network node is based on collected data (herein referred to as "map fingerprint data") which is continually updated and evolving as more measurements are added. This improves the likelihood that a suitable network node providing the best level of service is selected.

The term "map" refers to a spatial map that has been created over a period of time by recording all location coordinates of the places frequented by a mobile terminal user. Such map would cover areas such as:
 coordinates of parts of a home;
 coordinates of desk at work, meeting rooms, corridors;
 route employed for commuting between home and office;
 social visits like pubs, parks, etc; and
 places of shopping.

The map is converted into a grid of smaller "bins" (locations) based on a pre-defined resolution. An exemplary grid is shown by the dashed lines in FIG. 2. It will be understood that grid resolutions other than that shown in FIG. 2 may be employed.

The term "fingerprint data" refers to the data associated with each bin on the map. The data may include, for example:
 List of network nodes in range that are available for connection;
 Data relating to radio characteristics with respect to each available network node, including, but not limited to, Received Signal Strength Indicator (RSSI), Signal-to-Interference-plus-Noise Ratio (SINR), throughput, Quality of Service (QoS), and loading factor; and
 Data relating to usage characteristics including, but not limited to, type of service used (e.g., voice or data), radio access technology used, movement pattern (stationary, pedestrian or high speed mobility), connection time, and time duration of connection.

Preferably, the fingerprint data for each bin of the map is collected over a period of time, for example an ongoing period of time divided into a plurality of time slots. The duration of such time slots may range from a few seconds to few hours. Further, the granularity may be variable for different times of the day. For example, the data may be available for every five minute interval during day time, with the frequency reduced to every one hour during night time.

Figure 2:
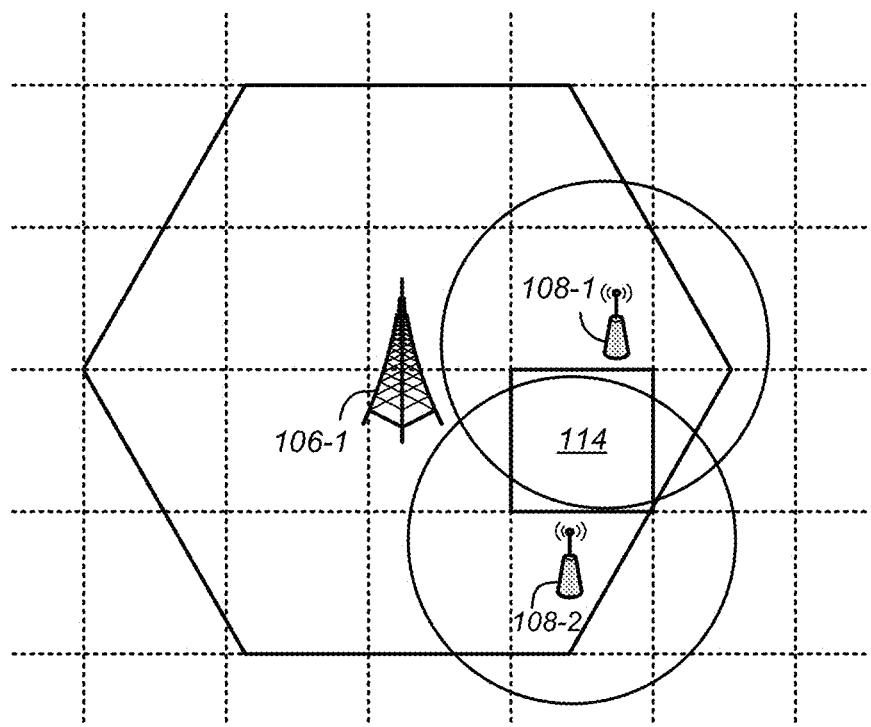
FIG. 2 schematically illustrates a spatial division of a portion of the multi-RAT wireless communication network shown in FIG. 1, according to an embodiment.
Figure 3:
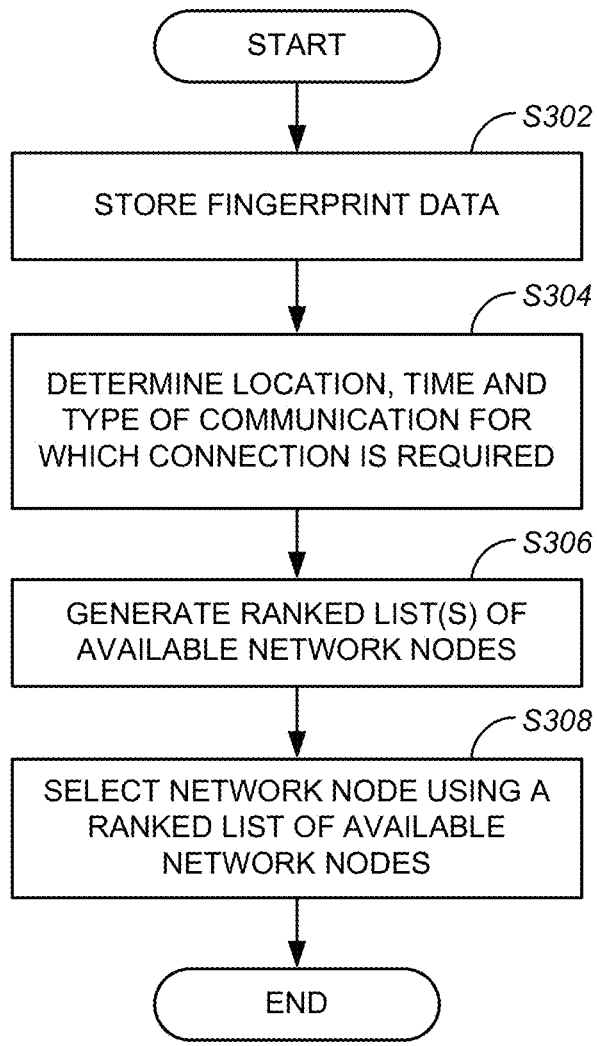
FIG. 3 is a flowchart showing a process for selecting a network node, according to an embodiment.

Thus, for location 114 shown in FIG. 2, the fingerprint data for each time slot of the day and week may comprise: identifiers of network nodes 106-1, 108-1 and 108-2, data about their radio characteristics, and data relating to usage characteristics (which reflects user behavior). In this way, the selection of a network node may be dependent not only on radio characteristics but also on user behavior. A method for a selector of selecting a network node using the aforementioned fingerprint data is described with reference to FIG. 3. At step S302, fingerprint data is stored at a mobile terminal, at a central entity accessible to the mobile terminal, or at both. Later, at step S304, when a connection is to be established, the location of the mobile terminal, and preferably also one or both of the time and the type of communication required for the connection, is determined. At step S306, a ranked list of available network nodes is generated based on the collected fingerprint data. This process will be described in more detail below. However, it is noted here that the process of generating a ranked list may take place, for example, when the fingerprint data is collected, with ranked lists stored at the mobile terminal, at a central entity accessible to the mobile terminal, or both. The order of steps S304 and S306 may therefore be reversed. At step S308, when the connection is to be established, the network node is selected in accordance with the ranked list of available network nodes.

A method of generating the ranked list of network nodes will be described in detail with reference to FIG. 4. However, an overview of the method will first be described below. The method is based on a tiered approach having three stages.

In the first stage, the set of radio characteristics (RSSI, SINR, and so on) that influence the ranking of the network nodes is determined. These define first order criteria that are used to order the network nodes by ranking with respect to each radio characteristic.

In the second stage, weighting factors are assigned to the radio characteristics. Weighting factors determine the extent to which a radio characteristic influences the ranking of network nodes. In other words, this allows quantifying how important a given radio characteristic is in the network node ranking process. For example, loading factor may be more important than RSSI for data intensive services. However, in cases where there is a limit on data allowance based on a user's subscription plan, then the type of communication service (free WiFi rather than usage-based cellular, for example) may play a more important role than throughput. Thus, it can be important to prioritize the radio characteristics that determine the network ranking process.

In the third stage, the weighting factors are defined as function of one or more usage characteristics. In particular, the values of the weighting factors, and therefore prioritization of the radio characteristics, are defined in order to take into account the data relating to usage characteristics that are part of the fingerprint data. This allows accounting for the confidence level of recorded fingerprint data, the predictability of movement and/or availability patterns of a user at given location and preferably time. It is expected that the weighting factors may not be constant at all times or locations. For example, based on the knowledge that there may be restricted access to a certain radio access technology on weekdays, during daytime, then ranking based on RSSI could be more efficient. Thus, weighting factor associated with RSSI would be higher than that for radio access technology and hence defined as a function of time and location. If it is known that at a certain time on weekend, a user frequents a cafeteria with free public WiFi access, then ranking based on loading factor would be more logical than that based on radio access technology, especially if the service is required for long hours of web-browsing. Thus, the weighting factor in this case should be a function of the service type. Thus, it is possible to re-assign values to the weighting factors as a function of usage characteristics such as time of use, location of use and service, in order to improve level of service as well as minimize potential disruption whilst ranking the network nodes for connection.

Figure 4:
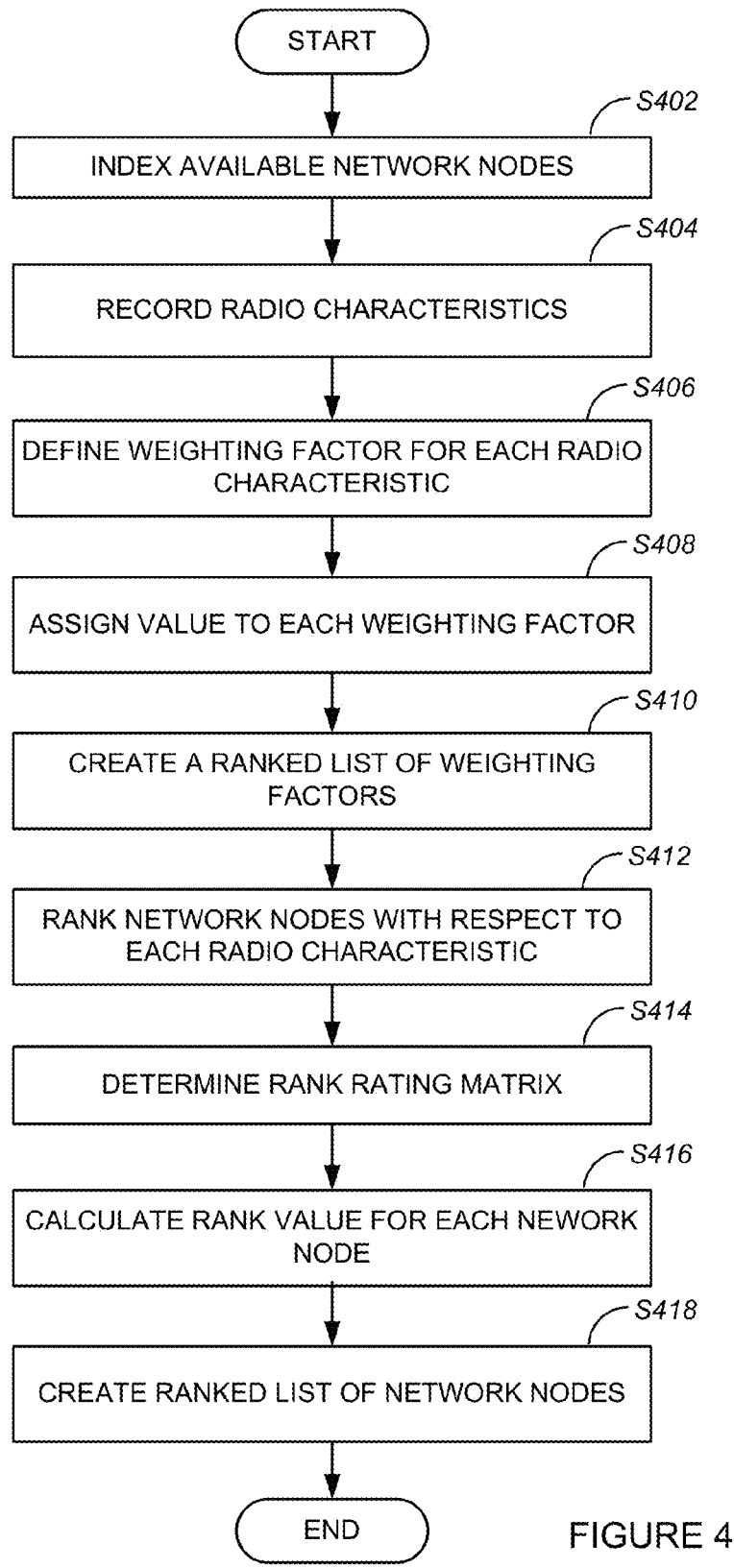
FIG. 4 is a flowchart showing a process of generating a ranked list of network nodes, according to an embodiment.

Referring now to FIG. 4, it is assumed that all the fingerprint data is available to mobile terminal at any given time "t" and is recorded by location "l". The time-stamp may comprise of one or combination of any of the following: month, week, hour, minute, and second. The location-stamp may comprise of one or combination of any of the following: Earth coordinates/relative position in accordance to the earth, room "tags" (living room/bathroom/bedroom/kitchen for homes and offices/conference rooms/floors for enterprise buildings), and building coordinates. The location may be a recorded value for a given time-stamp, or a real-time measured value or both. Finally, "S" is the communication service that was used.

Step S402: Index available network nodes ("NNs") by denoting list of available network nodes at a given time "t" and location "l" capable of providing communication service "S" by set $NN_{List}$ (that is, the network nodes available at the location of the mobile terminal for establishing a desired wireless communication connection), where:

$$NN_{List(t,l)} = \{NN_1, NN_2, \ldots, NN_n\} \quad (1)$$

Let "i" be the index denoting a network node in $NN_{List(t,l)}$ so that:

$$i \in \{1, 2, \ldots, n\} \quad (2)$$

Thus, 'n' is the size of the list.

Step S404: Record the values of each radio characteristic affecting the ranking of network nodes. The radio characteristics may include but are not limited to:
1. RSSI (dBm) denoted by $SS_{(t,l,i)}$
2. Interference (dB) denoted by $IF_{(t,l,i)}$
3. Throughput (kbps) denoted by $TF_{(t,l,i)}$
4. Bandwidth Loading (%) denoted by $LD_{(t,l,i)}$ Step S406: For each radio characteristic define a corresponding weighting factor, the value of which determines the ranking of the parameters. These weighting factors are represented by:
1. $WF_{SS}$
2. $WF_{IF}$
3. $WF_{TP}$
4. $WF_{LD}$ Step S408: Assign a value to each of the weighting factors based on fingerprint data relating to mobile terminal usage characteristics such as service "S", time "t", and location "l", as well as a constant "k":

$$WF_{SS} = f_{SS}(S,t,l) + k_{SS} \quad 1.$$

$$WF_{IF} = f_{IF}(S,t,l) + k_{IF} \quad 2.$$

$$WF_{TP} = f_{TP}(S,t,l) + k_{TP} \quad 3.$$

$$WF_{LD} = f_{LD}(S,t,l) + k_{LD} \quad 4.$$

The specific manner in which the values of the weighting factors are defined may vary from implementation to implementation. By way of example only, the usage characteristics ("S", "t" and "l") of each weighting factor (WFSS, WFIF, WFTP, WFLD) may be assigned a numerical value, with the value of each weighting factor being the sum of the numerical values of the respective usage characteristics.

Step S410: Create a ranked list of above weighting factors by decreasing order of their corresponding values. This list is denoted by WFRankedList.

Step S412: Create ranked lists of available network nodes in NNList(t,l) with respect to each parameter:
1. $NN_{RankedList(SS)}$ where elements of $NN_{List(t,l)}$ are arranged by increasing order of $SS_{(t,l,i)}$
2. $NN_{RankedList(IF)}$ where elements of $NN_{List(t,l)}$ are arranged by decreasing order of $IF_{(t,l,i)}$
3. $NN_{RankedList(TP)}$ where elements of $NN_{List(t,l)}$ are arranged by increasing order of $TP_{(t,l,i)}$
4. $NN_{RankedList(LD)}$ where elements of $NN_{List(t,l)}$ are arranged by decreasing order of $LD_{(t,l,i)}$ Step S414: Determine rank rating matrix (RRM). If the size of list $NN_{List(t,l)}$ is "n", then the rank rating (RR) for each network node is determined with respect to each parameter as per following rules: highest ranked member in Ranked lists are awarded rank rating of value "n", which decrements by "1" for every subsequent member of the list. Then the RRM for NN, where $i \in \{1, 2, \ldots, n\}$ is:

$$RRMi = \{RRi(SS), RRi(IF), RRi(TP), RRi(LD)\} \quad (3)$$

Step S416: Calculate the rank value (RV) for each network node in $NN_{List(t,l)}$ based on its Rank Rating and the Weighting Factors as follows:

$$RV_i = (RR_{i(SS)} * WF_{SS}) + (RR_{i(IF)} * WF_{IF}) + (RR_{i(TP)} * WF_{TP}) + (RR_{i(LD)} * WF_{LD}) \quad (4)$$

Step S418: Create a ranked list of network nodes in $NN_{list(t,l)}$ by decreasing order of their corresponding values of $RV_i$. This list is denoted by $NN_{RankedList}$.

Figure 5:
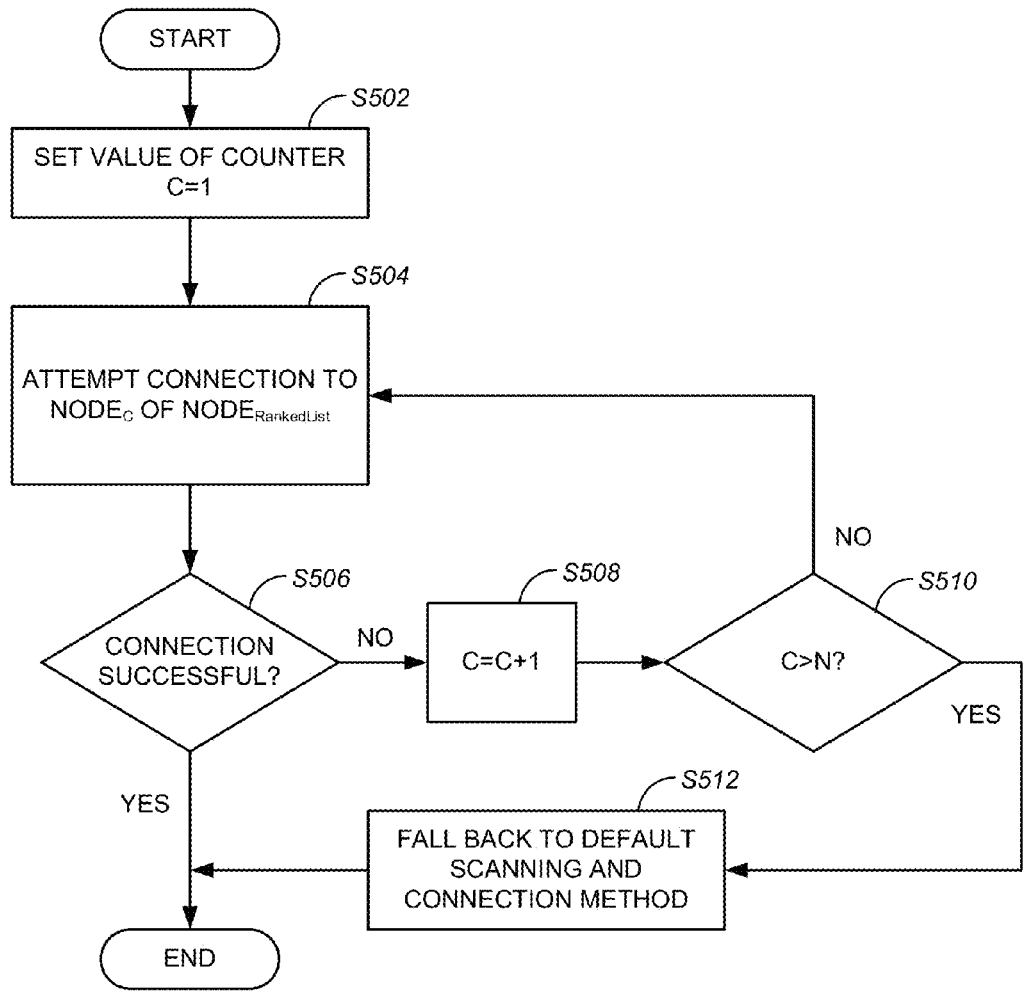
FIG. 5 is a flowchart showing a process of using the a ranked list of network nodes to select a network node, according to an embodiment.

The selection of a network node using a list $NN_{RankedList}$ generated in accordance with the above process is described below with reference to FIG. 5.

Step S502: Set value of a counter "c" to 1.

Step S504: Attempt connection to $c^{th}$ network node in $NN_{RankedList}$.

Step S506: If a connection at step S504 is achieved, then the process ends. If the attempted connection is not achieved then method proceeds to step S508.

Step S508: Increment counter value "c" by 1.

Step S510: If the counter value is less than the size of the list defined in step S402 of FIG. 4 (i.e., c>n), then go to step S512. Otherwise, go to step S504.

Step S512: Fall back to default scanning and connection mechanism of the mobile terminal.

Figure 6:
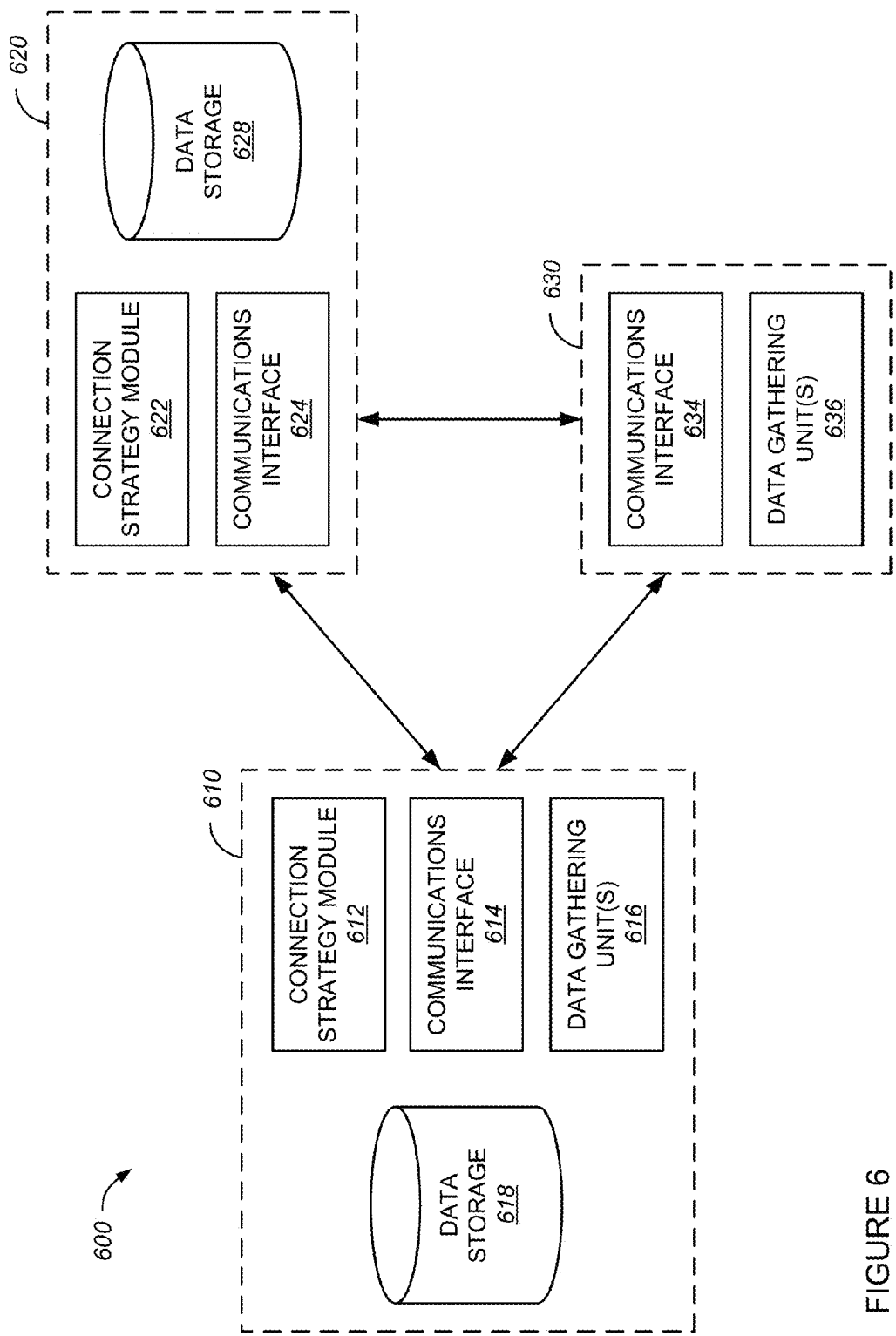
FIG. 6 is a functional block diagram showing a mobile terminal, central server and network node, according to various embodiments.

A functional block diagram of a system for implementing the methods described above is shown in FIG. 6.

The system 600 comprises a mobile terminal 610, a central entity 620 and a network node 630. Each of the mobile terminal 610, central entity 620 and network node 630 includes a respective communications interface 614, 624, 634 for transmitting and receiving signals. Such signals may be transmitted wirelessly and/or, in the case of communication between the central entity 620 and the network node 630, via a wired line. Furthermore, the central entity 620 may be co-located at the network node 630 and may transmit fingerprint data to the mobile terminal during an existing connection if convenient. Furthermore, the communications interface may employ one or more radio access technologies, so that the mobile terminal 610 and/or network node 630 may have multi-RAT functions. Each of the connection strategy modules 612, 622 provides the functionality of a connection strategy as described above. As will become apparent from the embodiments described below, one or both of the mobile terminal 610 and the central entity 620 may have such functionality. Similarly, one or both of the mobile terminal 610 and the central entity 620 may store fingerprint data in a respective data storage device 618, 628. The mobile terminal 610 also includes one or more data gathering units 616 for obtaining the fingerprint data. Such units may include, for example, a location sensor (e.g., a GPS sensor), a timing unit, a signal measuring unit, and so on. The network node 630 may similarly include, for example, a timing unit, a signal measuring unit, and so on.

In one embodiment, the ranking of network nodes takes into account fingerprint data determined by mobile terminals located in areas covered by multiple network nodes. In particular, each mobile terminal determines fingerprint data relating to that terminal, such as estimated data rate, connection latency, interference, network load, for locations and times at which that terminal operates. The fingerprint data can therefore be recorded as a function of location and time. The fingerprint data are then sent to the central entity, where the fingerprint data from the individual mobile terminals is stored. This may include, for example, replacing existing data with more recent data, combining existing data with more recent data (e.g., updating a moving average), or otherwise modifying existing data. By collecting data in this way, knowledge of the overall network environment can be gained so that ranked lists of available network nodes can be generated for different locations and times. As such, it can be advantageous for the central entity to generate the ranked lists of available network nodes. The ranked lists may be made available to the mobile terminals in advance rather than at the time of establishing the connection.

In another embodiment, mobile terminals use their own fingerprint data to generate ranked lists of available network nodes. This is different from the previous embodiment, where the ranked list for a particular mobile terminal is generated by the central entity based on fingerprint data collected from other mobile terminals. However, it will be appreciated that aspects of the embodiments can be combined. For example, a mobile terminal may replace, combine, or otherwise modify its own archive of (possibly out-of-date) data with more recent data obtained from the central entity. Furthermore, mobile terminals may supplement their own archive of fingerprint data with fingerprint data obtained from the central entity. Such data may correspond to a previously unvisited location for example. As in the previous embodiment, mobile terminals may obtain data from the central entity in advance rather than at the time of establishing the connection.

In yet another embodiment, which involves an interaction/iteration between the embodiments described above, when a mobile terminal selects a network node, fingerprint data relating to the selected network node is sent to the central entity. That is, data relating to one or more of the radio characteristics of the selected network node and data relating to communication usage of the mobile terminal with respect to the established connection (e.g., location of the mobile terminal, the connection time, and the communication service used) is sent to the central entity. By accumulating information about the selected network nodes from multiple mobile terminals, the central entity gains aggregated information about, for example, the loading information and usage pattern of network nodes. By gaining such information, the central entity can update the fingerprint data relating to the network nodes in an iterative manner. This iterative process is expected to lead to a convergence of the network node ranking. This is because network node ranking will affect subsequent selection of network nodes which, in turn, is likely to reinforce the network node ranking. Atypical selections (outlying fingerprint data) are therefore less likely to significantly affect the ranking of the network nodes. The iterative process is considered to conclude once all the mobile terminals' choices of network nodes (i.e., the ranking of network nodes) converge and cease to change. In other words, the choice of network node converges to one particular network node for a given location, time and communication service.

Yet another embodiment is based on the realization that the usage or movement pattern of a mobile terminal may change, that new users may be added to the network, and that existing users may leave the network. In other words, a mobile terminal's usage or movement pattern is not always the same so that the convergence towards a 'static' ranking of the network nodes described in the previous embodiment cannot always be achieved. Accordingly, an evaluation window can be specified so that the decision making is not dependent on the mobile terminals' instant feedback on the selected network node ranked list but on a window in the historical data. For example, the evaluation window may extend over a period of weeks or months.

Figure 7:
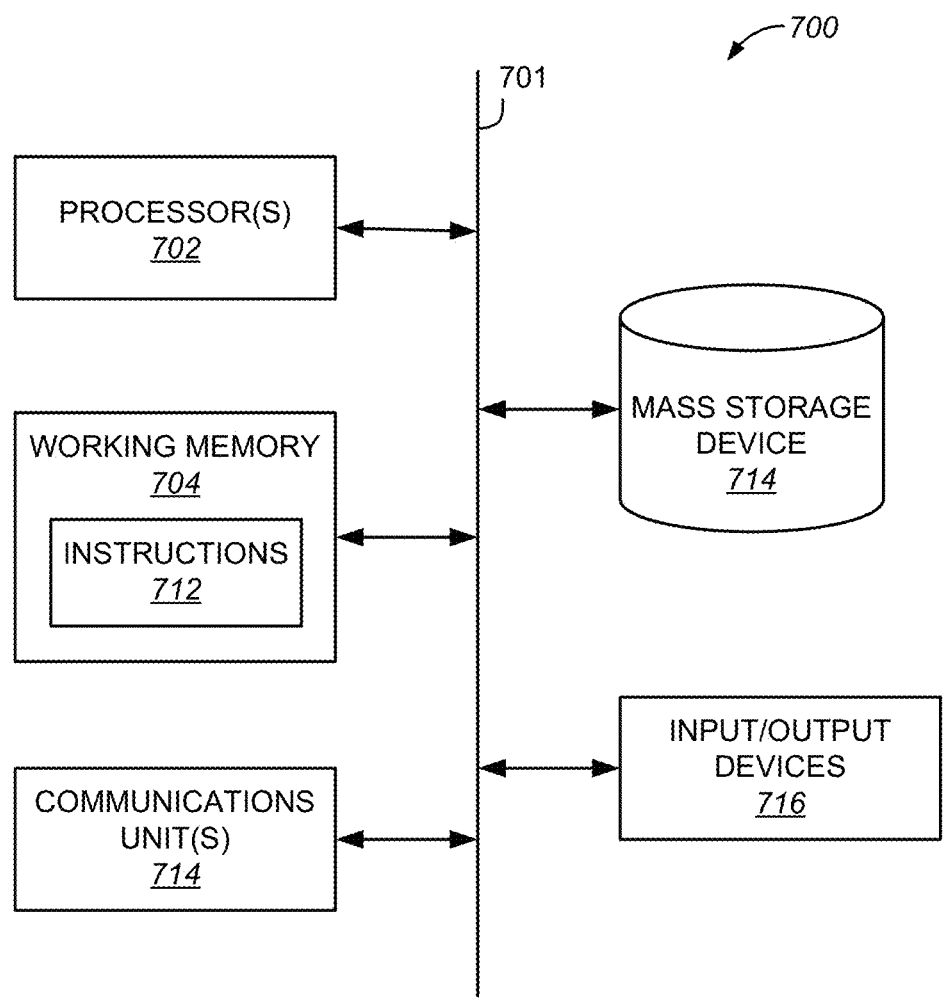
FIG. 7 schematically illustrates a computing device on which embodiments maybe be implemented.

FIG. 7 is a block diagram of a computing device 700, within which a set of instructions for causing the computing device 700 to perform any one or more of the methodologies discussed herein may be executed. The computing device 700 may be a mobile device such as a cell phone, laptop computer or PDA, a network node, a server computer, or any computing device capable of executing a set of instructions (sequential or otherwise) that specify actions to be taken by the computing device 700.

The computing device 700 may include a processor 702 (e.g., a central processing unit (CPE), a graphics processing unit (GPU) or both), a working memory 704 and mass storage device 714, all of which communicate with each other via a general purpose bus 701. The computing device 700 may further include one or more communications units 708 and input/output devices 710. Input devices can include, for example, a display, a keyboard, a mouse or other pointing device, a touchscreen, biometric recognition means, or any other means by which a user input can be interpreted and converted into data signals. Output devices can include, for example, audio/visual output hardware devices such as a visual display unit, a speaker or any other device capable of presenting information.

The mass storage device 714 stores machine code instructions 712 (i.e. software) embodying any one or more of the methodologies or functions described herein. The machine code instructions 712 may also reside, completely or at least partially, within the working memory 712 and/or within the processor 702 during execution thereof by the computer device 700. The machine code instructions 712 may further be received over a network via the communications unit(s) 708. Also, a computer program product, comprising a storage medium, can be introduced to the computing device 700, so that stored machine code instructions can then be transferred to the computing device 700. Furthermore, the reader will appreciate that the computing device 700 may be supplied with known software such as an operating system (e.g. Android, iOS, Mac OS, MS Windows, Unix, or Linux), so that any computer program may be developed as a new, stand-alone program or as a plug-in to existing computer programs.

The communications unit(s) 708 is connected to the general purpose bus 701 and may comprise a wireless communications unit connected to one or more antennas to and/or a wired communications unit. Accordingly, different wired and/or wireless technologies including TCP/IP, HTTP, Ethernet, 802.11x, WiMax, LTE, and others, may be employed.

Although various embodiments have been described in a mobile terminal selects between two (or more) network nodes employing different radio access technologies, it will be appreciated that the techniques described herein apply equally to the selection between network nodes each employing the same radio access technology (or radio access technologies in the case of multi-RAT network nodes).

The subject matter claimed herein is not limited to embodiments that solve any disadvantages or that operate only in environments such as those described above. Rather, these are only provided to illustrate example technology areas where some embodiments described herein may be practiced.

All examples and conditional language recited herein are intended to aid the reader in understanding the invention and the concepts contributed by the inventor to furthering the art, and are to be construed as being without limitation to such specifically recited examples and conditions. Although embodiments have been described in detail, it should be understood that the various changes, substitutions, and alterations could be made without departing from the spirit and scope of the invention.

What is claimed is:

1. A method performed by a mobile terminal for selecting a network node with which the mobile terminal is to establish a connection for wireless communication, the method comprising:
storing, for each of a plurality of locations and each of a plurality of time intervals of the day, fingerprint data comprising:
identifiers of network nodes available for connection,
historical radio characteristics data relating to a plurality of different radio transmission and/or reception characteristics of the network nodes, and
historical mobile terminal usage data relating to past communication activity of mobile terminals;
determining a current location of the mobile terminal and a current time;
generating a ranked list of network nodes that are available for establishing the connection, each of the available network nodes being ranked based on the historical radio characteristics data corresponding to the current location of the mobile terminal and the current time, and on weighting factors associated with the plurality of different radio transmission and/or reception characteristics, each of the weighting factors having a value determined based on the historical mobile terminal usage data corresponding to the current location of the mobile terminal and the current time; and
selecting the network node for establishing the connection with the mobile terminal based on the ranked list of network nodes,
wherein the plurality of time intervals include time intervals having different lengths for different times of the day.

2. A method according to claim 1, wherein the historical mobile terminal usage data relates to at least one of: time of use, type of communication service used, mobile terminal mobility during use, and location of use.

3. A method according to claim 1, wherein generating the ranked list comprises, for each of the plurality of different radio transmission and/or reception characteristics: determining a rank rating for each of the available network nodes, and weighting each rank rating with the weighting factor associated with the transmission and/or reception radio characteristic.

4. A method according to claim 1, wherein the available network nodes are configured to use a plurality of different radio access technologies.

5. A method according to claim 1, wherein at least some of the fingerprint data is retrieved from a central entity accessible to mobile terminals.

6. A method according to claim 5, wherein at least some of the historical fingerprint data is based on measurements performed by the network nodes.

7. A method according to claim 5, wherein at least some of the historical data is based on measurements performed by one or more mobile terminals including the mobile terminal.

8. A method according to claim 5, wherein new data relating to one or more of the plurality of different radio transmission and/or reception characteristics of the selected network node and/or new data relating to mobile terminal use with respect to the connection is sent to the central entity.

9. A mobile terminal, comprising:
memory configured to store, for each of a plurality of locations and each of a plurality of time intervals of the day, fingerprint data comprising:
identifiers of network nodes available for connection,
historical radio characteristics data relating to a plurality of different radio transmission and/or reception characteristics of the network nodes, and historical mobile terminal usage data relating to past communication activity of mobile terminals;

a locator configured to determine a current location of the mobile terminal;

a timer configured to determine a current time; and processing processor configured to:

generate a ranked list of network nodes that are available for establishing a connection for wireless communication, each of the available network nodes being ranked based on the historical radio characteristics data corresponding to the current location of the mobile terminal and the current time, and on weighting factors associated with the plurality of different radio transmission and/or reception characteristics, each of the weighting factors having a value that is determined based on the historical mobile terminal usage data corresponding to the current location of the mobile terminal and the current time, and select the network node for establishing the connection with the mobile terminal based on the ranked list of network nodes, wherein plurality of time intervals include time intervals having different lengths for different times of the day.

* * * * *